Patented Aug. 14, 1945

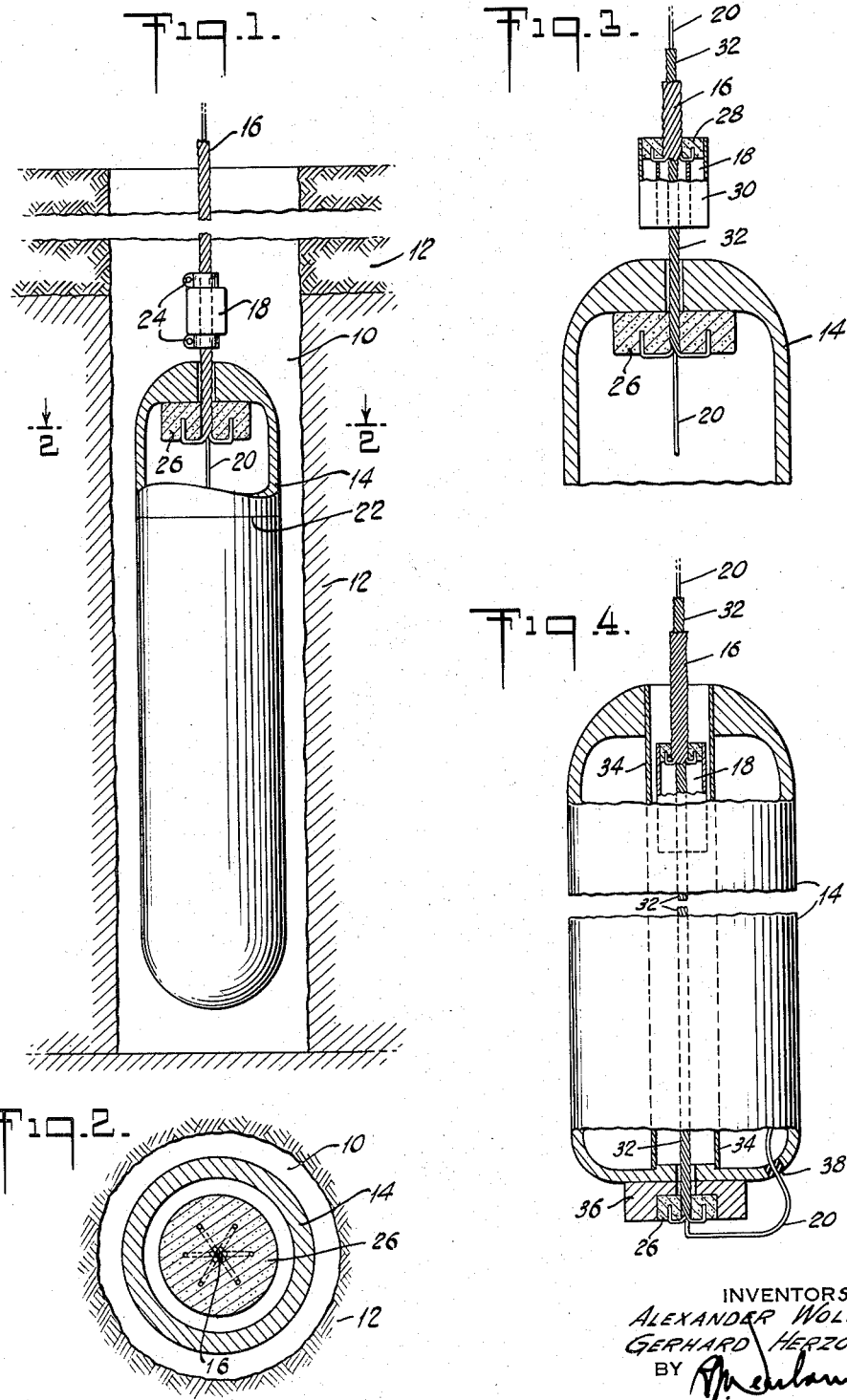

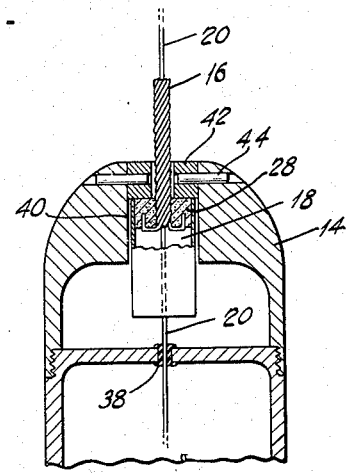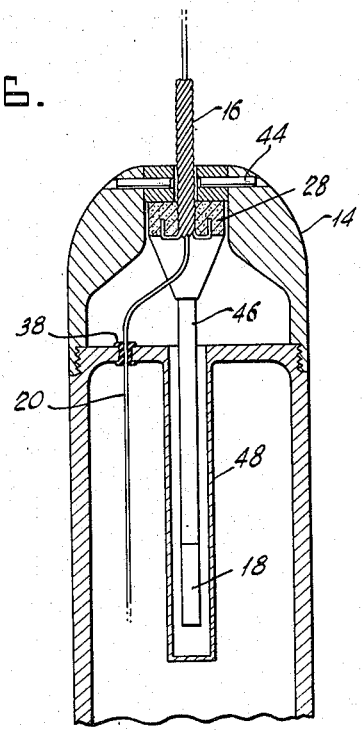

2,382,279

UNITED STATES PATENT OFFICE 2,382,279

DEVICE FOR RECOVERING A RADIATION SOURCE

Alexander Wolf and Gerhard Herzog, Houston, Tex., assignors to The Texas Company, New York, N. Y., a corporation of Delaware Application November 27, 1943, Serial No. 511,991

7 Claims. (Cl. 250—83.6)

This invention relates to radiological bore-hole logging and more particularly to a device for recovering an object such as a source of penetrative radiation used in well or bore-hole logging in the event that the logging tool or instrument becomes lodged in the hole during the logging operation. The principal object of the invention is the provision of means for attaching the source and the instrument to the suspending cable so that the source can be recovered intact even though the logging instrument has to be abandoned in the hole.

In radiological well logging such as neutron logging, scattered gamma-ray logging and logging by induced radioactivity, a considerable amount of radium or other radioactive material is usually lowered into the well or bore hole together with a radiation detector. In neutron logging, for instance, a source of neutron radiation, such as a mixture of radium and beryllium, is usually mounted within a housing or capsule together with a detector of slow neutrons. Certain electrical equipment such as a preamplifier may also be disposed within the housing. The entire instrument is suspended from a wire cable and is then lowered and raised through the hole, records being kept of the position of the instrument in the hole and the response of the detector as the instrument traverses the different strata penetrated by the well hole.

It sometimes happens that the instrument becomes lodged or stuck in the hole due to caving of the hole walls, obstructions in the hole, etc. In the attempts to dislodge the instrument, the suspending cable may be broken after which a "fishing" job is necessary. This is often unsuccessful and it therefore becomes necessary to abandon the entire instrument with the source of radiation in the hole. The source of radiation may represent a value of up to ten thousand dollars.

In accordance with the invention means are provided for attaching the instrument to the cable in such a manner that in the event of the instrument becoming lodged in the hole a predetermined upward pull on the cable will cause the radiation source to become disconnected from the rest of the instrument so that it can be pulled to the surface. The radiation source, of course, is relatively small as compared to the instrument and usually can be pulled upwardly through cavings or obstructions which would prevent the removal of the entire instrument. One way of accomplishing this result is to attach the source securely to the cable, either above or within a passage in the detector housing and to provide a releasable connection or coupling between the cable and the housing so that upon a predetermined upward pull of the cable the coupling will be released so that the source, still attached to the cable, can be pulled to the surface. In another embodiment, part of the cable can be weakened where it is attatched to the housing, the source being attached to the unweakened cable so that the cable can be broken at the weakened portion. In still another embodiment, the radiation source will be securely attached to the cable and the cable attached to the detector housing by shearable means, which latter means can be severed when the cable is pulled so as to remove the source from the housing.

For a better understanding of the invention, reference may be had to the accompanying drawings in which:

Figure 1 is a vertical elevation partly in section through a bore hole showing one means of attaching the cable to the radiation source and to the detector housing;

Figure 2 is a section on the line 2—2 of Figure 1 looking in the direction of the arrows;

Figure 3 is a vertical sectional view showing another form of connection;

Figure 4 is a vertical elevation, partly in section, showing the radiation source as disposed within the detector housing;

Figure 5 is a vertical sectional view showing the source within the detector housing but above the detector; and Figure 6 is a vertical elevation somewhat similar to Figure 5 but showing the source disposed within the detector.

Referring to the drawings, a bore hole 10 is shown as traversing formations 12 which it is desired to log by means of an instrument represented generally by the housing or capsule 14. A cable 16 serves to suspend the instrument 14 and a source of penetrative radiation 18 so that the assembly can be lowered and raised through the bore hole. The cable 16 includes one or more electrical conductors 20 serving to connect suitable instruments, not shown, at the surface to the radiation detector disposed generally within the housing 14 and below the line 22. The radiation source 18 is securely attached to the cable 16 above the housing 14 by means of a pair of clamps 24 while the lower end of the cable is shown as imbedded in a block 26 of a fairly soft metal, such as Babbitt or solder. In the event that the instrument housing 14 should become lodged in the hole 10, a predetermined upward pull on the cable 16 will cause the lower end of the cable to be pulled out of the block 26 and then upwardly out of the housing. The source 18, being securely clamped to the cable above the housing, will be removed from the hole with the cable.

The cables used in this type of work are often made up of two or more layers of wire wound spirally in opposite directions about a centrally disposed electrical conductor. In Figure 3, a cable of this type is shown as attached to a radiation source 18 and to an instrument housing 14. The outer layer of the cable 16 is cut back from the inner layer and is connected to the radiation source 18 by imbedding the strands in a suitable substance such as a hard metal 28 to which a small housing 30 for the radiation source is secured. The inner layer 32 of the cable passes into the housing 14 and is imbedded in a block of soft metal 26. The electrical conductor 20 passes downwardly to the detector or amplifier, not shown. In this modification a predetermined upward pull on the cable will either pull the inner layer 32 from the metal block 26 or will break the cable below the source 18. In either case, the source will be removed with the cable 16 while the instrument housing 14 can remain in the hole.

It is sometimes desirable to mount the radiation source within the housing or even within the detector itself. In Figure 4, the housing 14 is shown as provided with a central well or tube 34 within which the radiation source 18 is disposed. The source 18 is attached to the outer layer of the cable 16 as was described with reference to Figure 3 while the inner, weaker cable portion 32 passes downwardly through the tube 34 and at the bottom of the housing where it is imbedded in a block or mass of soft metal 26 disposed within a connecting block 36. The electrical conductor 20 passes outwardly at the lower end of the cable and then upwardly into the detector housing through a suitable insulating bushing 38.

In Figures 5 and 6, other embodiments are shown in which shearable means are provided between the cable and the housing. In Figure 5, the cable 16 is connected securely to the radiation source 18 as by imbedding the ends of the cable in a hard metal or other substance 28. The electrical conductor 20 passes downwardly into the detector through an insulating bushing 38. In this modification, the upper end of the housing 14 is provided with an enlarged opening 40 and in the upper portion of this opening an annular member or ring 42 has a sliding fit and is connected to the housing 14 by means of one or more shear pins 44. The upper end of the radiation source container abuts against the ring 42 and in normal operation the source and the housing 14 will remain connected to the cable 16 as shown in this figure. In case the housing 14 becomes stuck in the hole, an abnormal upward pull on the cable 16 will cause the pins 44 to be severed whereupon the radiation source 18 will be pulled out of the housing 14 and upwardly to the surface.

In Figure 6, the arrangement is similar to that described with reference to Figure 5 with the exception that the radiation source 18 is disposed at the end of a downwardly projecting tube or rod 46 depending from a mass of hard metal 28 to which the lower end of the cable 16 is attached. That portion of the housing 14 containing the detector is provided with a small well or tube 48, the source 18 being disposed within this tube. The electrical conductor 20 passes into the detector housing through a suitable bushing 38. If it is desired to abandon the instrument in the hole, a predetermined pull on the cable 16 will sever the shear pins 44 and, of course, the electrical conductor 20, and the radiation source 18 will be pulled upwardly from the small well 48 and out of the housing 14 to be returned to the surface on the cable 18.

It will be seen from the foregoing that means have been provided whereby a suspending cable can be disconnected or released from an instrument lodged in the well while the valuable radiation source will be removed from the instrument and pulled upwardly to the surface without loss or damage thereto. Still other releasable couplings could be provided between the cable and the instrument housing, such as, for instance, a suitable trigger mechanism between the cable and the housing, the mechanism adapted to be actuated or released by a "go-devil" adapted to slide downwardly on the suspending cable. Again, a string of rods or tubing may be used instead of the cable 16 for supporting the instrument.

Obviously many modifications and variations of the invention, as hereinbefore set forth, may be made without departing from the spirit and scope thereof, but only such limitations should be imposed as are indicated in the appended claims.

We claim:

1. In the radioactive logging of bore holes wherein a source of penetrative radiation and an associated instrument are passed through the hole on a suspending device, means for recovering said source in the event said instrument becomes stuck in the hole comprising means for securing said source to said suspending device, and releasable means for attaching said instrument to said suspending device, said releasable means being actuated on a predetermined pull between the suspending device and the instrument to disconnect the suspending device from the instrument so that the source of radiation can be pulled from the hole by said suspending device.

2. In the radioactive logging of bore holes wherein a source of penetrative radiation and a radiation detector are passed through the hole by means of a suspending cable, means for recovering said source in the event said detector becomes stuck in the hole comprising a clamping device for securing said source to the cable, and a releasable clamping device for attaching said detector to said cable, said releasable clamping device being actuated on a predetermined pull between the cable and the detector to disconnect the cable from the detector so that the source of radiation can be pulled from the hole by said cable.

3. A well logging tool comprising a housing, an instrument in said housing, a source of penetrative radiation associated with said instrument, means for lowering and raising the tool through a bore hole, releasable coupling means attaching said lowering and raising means to said housing so that a predetermined force exerted on said lowering and raising means will cause said means to become detached from said housing and means for securely affixing said source to said lowering and raising means whereby said source will be removed from the hole by the lowering and raising means when said predetermined force is exerted.

4. A well logging tool comprising a housing, a radiation detector in said housing, a source of penetrative radiation associated with said detector, a cable for lowering and raising the tool through a bore hole, releasable coupling means attaching said cable to said housing so that a predetermined upward pull on said cable will detach the cable from said housing and means for securely affixing said source to said cable whereby said source will be pulled upwardly through the hole when the cable is detached from the housing.

5. In combination with a radioactive bore-hole logging instrument and a cable for lowering and raising said instrument through a bore hole, said instrument comprising a source of penetrative radiation and a radiation detector, means for securing said source to said cable, and releasable means for attaching said detector to said cable so that, in case the detector should become stuck in the hole, a predetermined upward pull on the cable will release the cable from the detector and raise the source through the hole.

6. A well logging tool comprising a housing, a radiation detector in said housing, a source of penetrative radiation associated with said detector, a cable for lowering and raising the tool through a bore hole, said cable having a weakened portion near its lower end, coupling means attaching the weakened portion of said cable to said housing and means for securely affixing said source to the unweakened cable.

7. A well logging tool comprising a housing, a radiation detector in said housing, a source of penetrative radiation in said housing, a cable for lowering and raising the tool through a bore hole, releasable coupling means attaching said cable to said housing and means for securely affixing said source to said cable, said coupling means comprising a member affixed to said cable and having engagement with said housing, and a shear pin normally holding said member rigidly connected to said housing, the arrangement being such that in case the housing becomes stuck in the bore hole a predetermined force exerted on said cable will cause said pin to be sheared so that the cable will pull the radiation source from the housing.

ALEXANDER WOLF.
GERHARD HERZOG.